United States Patent
Oguma et al.

(10) Patent No.: US 8,982,374 B2
(45) Date of Patent: Mar. 17, 2015

(54) IMAGE FORMING SYSTEM AND IMAGE FORMING METHOD FOR COLLECTIVELY SUPPORTING OUTPUT DATA FORMATS AND AUTHENTICATION METHODS

(75) Inventors: Takashi Oguma, Osaka (JP); Toru Yasui, Osaka (JP)

(73) Assignee: KYOCERA Document Solutions Inc. (JP)

( * ) Notice: Subject to any disclaimer, the term of this patent is extended or adjusted under 35 U.S.C. 154(b) by 792 days.

(21) Appl. No.: 13/048,512

(22) Filed: Mar. 15, 2011

(65) Prior Publication Data

US 2011/0228311 A1    Sep. 22, 2011

(30) Foreign Application Priority Data

Mar. 16, 2010 (JP) .................................. 2010-058738
Mar. 16, 2010 (JP) .................................. 2010-058739

(51) Int. Cl.
*G06K 15/00* (2006.01)
*H04L 29/06* (2006.01)
*G06F 21/30* (2013.01)
(Continued)

(52) U.S. Cl.
CPC .............. *H04L 63/08* (2013.01); *G06F 21/305* (2013.01); *G06F 21/608* (2013.01); *G06Q 10/10* (2013.01); *H04L 63/0892* (2013.01)
USPC ......... 358/1.14; 358/1.9; 358/1.13; 358/1.15; 358/1.16

(58) Field of Classification Search
USPC ....................................................... 358/1.15
See application file for complete search history.

(56) References Cited

U.S. PATENT DOCUMENTS

| 2004/0021890 | A1 | 2/2004 | Hirai et al. |
| 2005/0015585 | A1* | 1/2005 | Kurose ........................ 713/155 |
| 2005/0172341 | A1* | 8/2005 | Kanno ............................ 726/26 |

(Continued)

FOREIGN PATENT DOCUMENTS

| CN | 1652503 A | 8/2005 |
| CN | 1660590 A | 8/2005 |

(Continued)

OTHER PUBLICATIONS

Merriam Webster Online Dictionary: Definition of convert. Accessed Aug. 5, 2014. http://www.merriam-webster.com/dictionary/convert.*

*Primary Examiner* — Miya J Cato
(74) *Attorney, Agent, or Firm* — McDonnell Boehnen Hulbert & Berghoff LLP (57) ABSTRACT

A multifunction peripheral (MFP) transmits read data (user identification information) obtained by a reader to a user-manager server device via a network. The user-manager server device specifies a data format of the read data, converts the data format into another data format to specify a user ID corresponding to the read data, performs a user authentication using the user ID, and transmits authorization information corresponding to a logged-in user. Further, the MFP receives the identification information corresponding to the logged-in user by a user authentication method specified by authentication setting data, and transmits the identification information to the user-manager server device. The authentication setting data is updated by the master authentication data stored in the user-manager server device. The user-manager server device performs the user authentication using the identification information, and transmits the authorization information corresponding to the logged-in user.

3 Claims, 10 Drawing Sheets

(51) Int. Cl.
*G06F 21/60* (2013.01)
*G06Q 10/10* (2012.01)

(56) References Cited

U.S. PATENT DOCUMENTS

| | | |
|---|---|---|
| 2005/0185217 A1 | 8/2005 | Nishizawa et al. |
| 2008/0231887 A1 | 9/2008 | Sakagami et al. |
| 2008/0298827 A1 | 12/2008 | Akiyama et al. |
| 2009/0180141 A1* | 7/2009 | Takaishi et al. ............ 358/1.15 |

FOREIGN PATENT DOCUMENTS

| | | |
|---|---|---|
| JP | 2001-202332 | 7/2001 |
| JP | 2004-005408 | 1/2004 |
| JP | 2005-244488 | 9/2005 |
| JP | 2008-140067 | 6/2008 |
| JP | 2008-244518 | 10/2008 |
| JP | 2008-282064 | 11/2008 |
| JP | 2008-296473 | 12/2008 |
| JP | 2009-199235 | 9/2009 |
| JP | 2009-289065 | 12/2009 |

* cited by examiner

IMAGE FORMING SYSTEM AND IMAGE FORMING METHOD FOR COLLECTIVELY SUPPORTING OUTPUT DATA FORMATS AND AUTHENTICATION METHODS

INCORPORATION BY REFERENCE

This application is based upon and claims the benefit of priority from corresponding Japanese Patent Application Nos. 2010-058738 and 2010-058739, both filed Mar. 16, 2010, the entire contents of each of which are incorporated by reference herein.

BACKGROUND

1. Field of the Invention

The present invention relates to an image forming system and an image forming method.

2. Description of the Related Art

In recent years, directory services such as Active Directory and e-Directory have been introduced in order to manage users and devices in a networked system. Some image forming apparatuses such as printers, copiers, and multifunction peripherals (MFPs) have a network function, which causes management of users and groups to be performed by such directory service. To manage the users by the directory service, a directory server device performs a user authentication for a user who has logged in to the image forming apparatus.

Further, authorization processing is performed on the image forming apparatus, which allows use of only a function (among various functions) permitted to a logged-in user who has succeeded in the user authentication. In the authorization processing, authorization information specifying a function that is permitted or prohibited for use has been previously set on the image forming apparatus for each user, and limitations are imposed on some functions to be used by the logged-in user, according to the authorization information. In addition, one known image forming system provides the image forming apparatus with the authorization information on the logged-in user who has succeeded in the user authentication, by using an intermediate server device that includes authorization information on each user.

In addition, one authentication method for the logged-in user includes inputting a user ID and a password as text via an operation panel of the image forming apparatus. In another method, a card reader is built into or connected to the image forming apparatus and the user presents an ID card to the card reader to log in to the image forming apparatus. Yet another method is based on a presented ID card and an input password.

When the card reader is built into or connected to the image forming apparatus, a driver that processes read data corresponding to an output data format of the card reader is built into the image forming apparatus. Therefore, when the card reader is exchanged or a new card reader is connected to the image forming apparatus, the model of the card reader to be replaced or connected is limited to one compatible with the output data format.

In this case, a method involving updating the driver corresponding to the card reader is available, but a system to which a large number of image forming apparatuses are connected needs to have the driver updated for each of the image forming apparatuses, which is inefficient. In addition, in the case of performing a user authentication on the directory server device, when a data format of the user ID received from the card reader differs from a format compatible with the directory server device, it is necessary to convert the data format, and it is therefore necessary to update the driver for each of the image forming apparatuses, which is inefficient.

Meanwhile, on the image forming apparatus, setting data that specifies the authentication method that can be used by permitted users among a plurality of authentication methods is set. Therefore, by changing a value of the setting data within the image forming apparatus, it is possible to change the user authentication method that can be used by the user. However, in order to unify the authentication methods on the large number of image forming apparatuses, it is necessary to change the setting data for each of the large number of image forming apparatuses, which is inefficient.

SUMMARY

The present disclosure relates to an image forming system and an image forming method that may collectively support readers having a plurality of output data formats and also collectively set the authentication methods on a large number of image forming apparatuses.

An image forming system according to one aspect of the present disclosure includes an image forming apparatus and a user-manager server device, which are connected to a network. The image forming apparatus includes a reader that reads user identification information corresponding to a logged-in user, and transmits the user identification information to the user-manager server device. The user-manager server device receives the user identification information from the image forming apparatus, identifies a data format of the user identification information, converts the data format into another data format to specify a user ID in the user identification information, performs a user authentication using the user ID, and if the user authentication is successful, transmits authorization information corresponding to the logged-in user to the image forming apparatus.

An image forming system according to another aspect of the present disclosure includes an image forming apparatus and a user-manager server device, which are connected to a network. The image forming apparatus stores authentication setting data, receives identification information corresponding to a logged-in user by a user authentication method specified by the authentication setting data, and transmits the identification information to the user-manager server device. The user-manager server device acquires the identification information from the image forming apparatus, performs a user authentication using the identification information, and if the user authentication is successful, transmits the authorization information corresponding to the logged-in user to the image forming apparatus.

An image forming method according to one aspect of the present disclosure includes: reading, via a reader in an image forming apparatus connected to a network, user identification information corresponding to a user; transmitting, via the image forming apparatus, the user identification information to a user-manager server device connected to the network; and receiving, via the user-manager server device, the user identification information, specifying a data format of the user identification information, and converting the data format into another data format to specify a user ID corresponding to the user identification information, performing a user authentication using the user ID, and if the user authentication of the user is successful, transmitting authorization information corresponding to the user to the image forming apparatus.

An image forming method according to another aspect of the present disclosure includes: acquiring, via an image forming apparatus connected to a network, identification information corresponding to a user by a user authentication method specified by authentication setting data, and transmitting the identification information to a user-manager server device connected to the network; and receiving, via the user-manager server device, the identification information from an image forming apparatus, performing a user authentication using the received identification information, and if the user authentication of the user is successful, transmitting authorization information corresponding to the logged-in user to the image forming apparatus.

DETAILED DESCRIPTION

Figure 1:
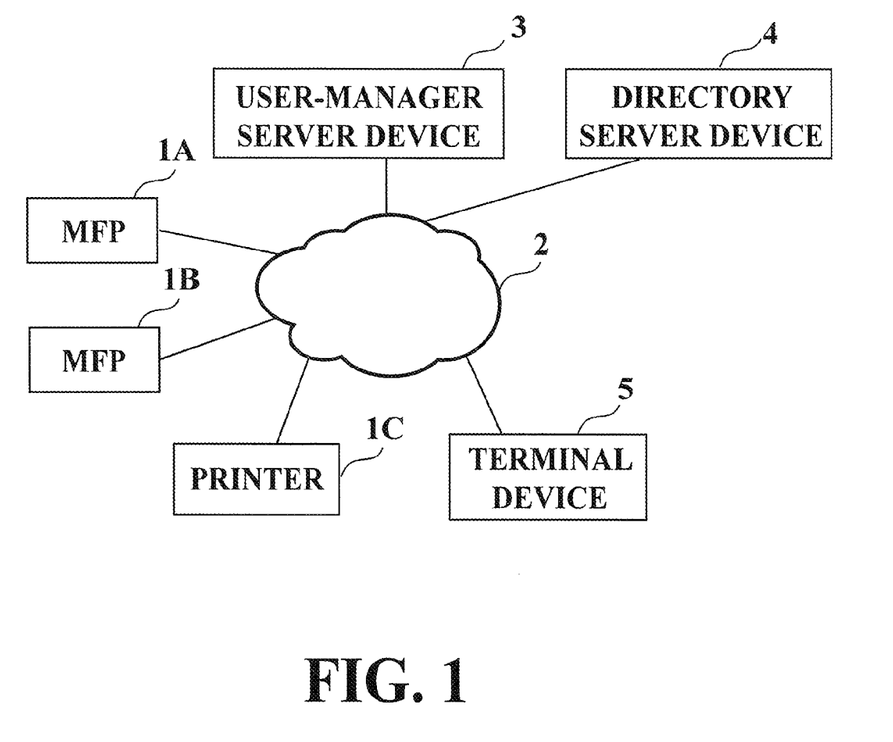
FIG. 1 is a block diagram illustrating a configuration of an image forming system according to a first embodiment or a second embodiment.

FIG. 1 is a block diagram illustrating a configuration of an image forming system according to a first embodiment or a second embodiment of the present disclosure. A plurality of multifunction peripherals (MFPs) 1A and 1B, and a printer 1C are connected to a network 2. Further connected to the network 2 are a user-manager server device 3, a directory server device 4, and a terminal device 5.

The MFP 1A is an image forming apparatus including a printer function, a scanner function, a copy function, a facsimile function, and the like, which uses those functions to execute various kinds of jobs responsive to receiving an instruction from an operation panel on the MFP 1A or from a host device (not illustrated) connected to the network 2. The MFP 1B is an image forming apparatus including a same or similar configuration. Further, the printer 1C is an image forming apparatus in the same manner as the MFPs 1A and 1B, but does not have the scanner function, the copy function, and the facsimile function.

The user-manager server device 3 is a server device that receives a user authentication request from the MFPs 1A and/or 1B and provides authorization information corresponding to a logged-in user to the MFPs 1A and/or 1B. Further, the directory server device 4 is a server device that provides a directory service such as Active Directory or e-Directory. Further, the terminal device 5 is an external device such as a personal computer that includes a network function, an input device such as a keyboard, and a display device such as a display.

First Embodiment

Figure 2:
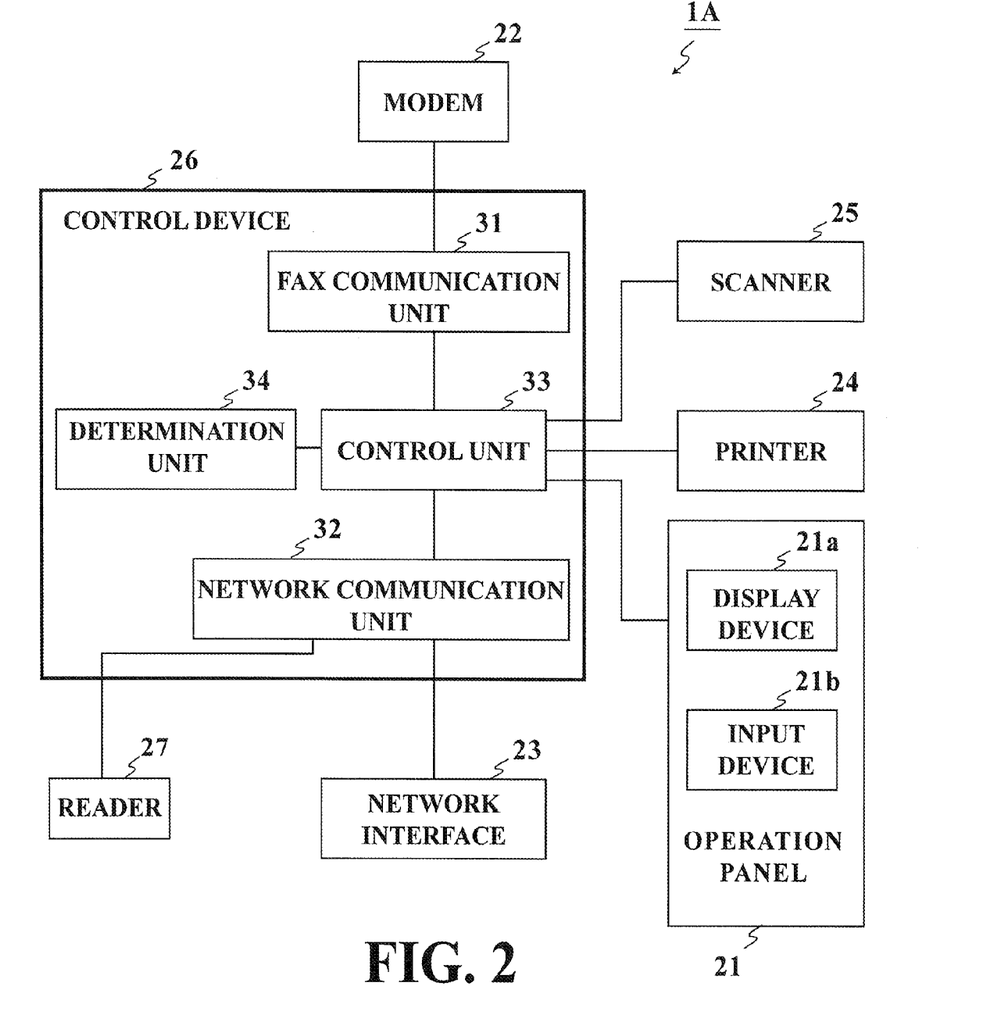
FIG. 2 is a block diagram illustrating a configuration of a multifunction peripheral (MFP) according to the first embodiment.

FIG. 2 is a block diagram illustrating a configuration of the MFP 1A according to the first embodiment. The MFP 1B has a same or similar configuration. The MFP 1A includes an operation panel 21, a modem 22, a network interface 23, a printer 24, a scanner 25, and a control device 26.

The operation panel 21 is preferably located on a casing of the MFP 1A, and includes a display device 21a that displays various kinds of information to the user and an input device 21b that receives a user operation. The display device 21a may include, for example, a liquid crystal display and various kinds of indicators. The input device 21b includes, for example, a touch panel and key switches.

The modem 22 is a communication device that may be connected to a subscriber's telephone line network such as a public switched telephone network (PSTN) and performs transmission/reception of facsimile data.

The network interface 23 is a device that may be connected to the computer network 2 in a wired or wireless manner, and enables data communications with other devices connected to the network 2.

The printer 24 is an internal device that performs printing on a paper sheet corresponding to a print request and delivers the printed paper sheet. In a case of an electrophotographic process, by causing a light source to emit light after charging a photoconductor drum based on printing data, the printer 24 forms an electrostatic latent image on the photoconductor drum, develops the electrostatic latent image by using toner, transfers a toner image onto the paper sheet, fixes the toner image, and delivers the printed paper sheet.

The scanner 25 is an internal device that applies light to one side surface or both side surfaces of a document fed from an automatic document feeder or a document placed by the user, receives reflected light or the like, reads an image of the document, and outputs the read image as image data.

The reader 27 is a device that reads user identification information and outputs the read data, and may be provided inside the MFP 1A or may be connected to the MFP 1A as a peripheral device. In this embodiment, the reader 27 is a card reader that reads the user identification information from an ID card such as a magnetic card or an IC card (i.e. smart card) and outputs the read data including the user identification information in a predetermined output data format. The predetermined output data format may be a character string data format or hexadecimal data format, for example. It should be noted that, the reader 27 may be a reader that reads biometric information (such as a fingerprint) associated with the user. In this case, a feature obtained from the biometric information is used as the user identification information. The reader 27 may be a contact type reader or a non-contact (i.e. proximity) type reader.

The control device 26 is a device that controls respective units in the MFP 1A and performs data processing. The control device 26 is configured as a computer including, for example, a central processing unit (CPU), a read only memory (ROM), and a random access memory (RAM). On the control device 26, the CPU implements various kinds of processing units by loading a program stored in the ROM or other such storage device (such as a flash memory) into the RAM and executing the program. The control device 26 implements a FAX communication unit 31, a network communication unit 32, a control unit 33, and a determination unit 34.

The FAX communication unit 31 is a processing unit that controls the modem 22 to receive the facsimile data. When receiving the facsimile data, the FAX communication unit 31 supplies the print request to the control unit 33.

The network communication unit 32 is a processing unit that controls the network interface 23 to enable data communications with the devices on the network 2 using various kinds of communication protocols. In the first embodiment, the network communication unit 32 transmits, to the user-manager server device 3, read data output from the reader 27, and receives the authorization information corresponding to the logged-in user from the user-manager server device 3. Further, for example, the network communication unit 32 receives the print request (page description language (PDL) data or the like) from the host device (not illustrated), and supplies the print request to the control unit 33.

The control unit 33 is a processing unit that receives a job request in response to a user operation via the operation panel 21 or a job request received from the host device (not illustrated) by the network interface 23 and the network communication unit 32, and controls the respective units in the MFP 1A to execute a job corresponding to the job request. The job requests may include a print request, a scan request, and a facsimile transmission request. Further, when a login operation occurs, the control unit 33 receives the read data from the reader 27, uses the network communication unit 32 to transmit the received read data without converting a format, and requests a user authentication, the authorization information, and the like from the user-manager server device 3. In the first embodiment, data type information that indicates a data format of the read data is transmitted with the read data.

The determination unit 34 is a processing unit that specifies, based on the authorization information corresponding to the logged-in user received from the user-manager server device 3 via the network interface 23 and the network communication unit 32, which function or functions the logged-in user is permitted to use or is prohibited from using from among the functions that the MFP 1A provides. The determination unit 34 stores data indicating permitted functions in a location such as the RAM. The control unit 33 references the data to impose a limitation on the use of the MFP 1A by the logged-in user. For example, when a limitation is imposed on the use of a color copy function by the particular logged-in user, a menu of the copy function may be displayed on the operation panel 21 so as to prevent the color copy function from being chosen. For example, a button for choosing the color copy function from black/color copy function may be grayed out.

Figure 3:
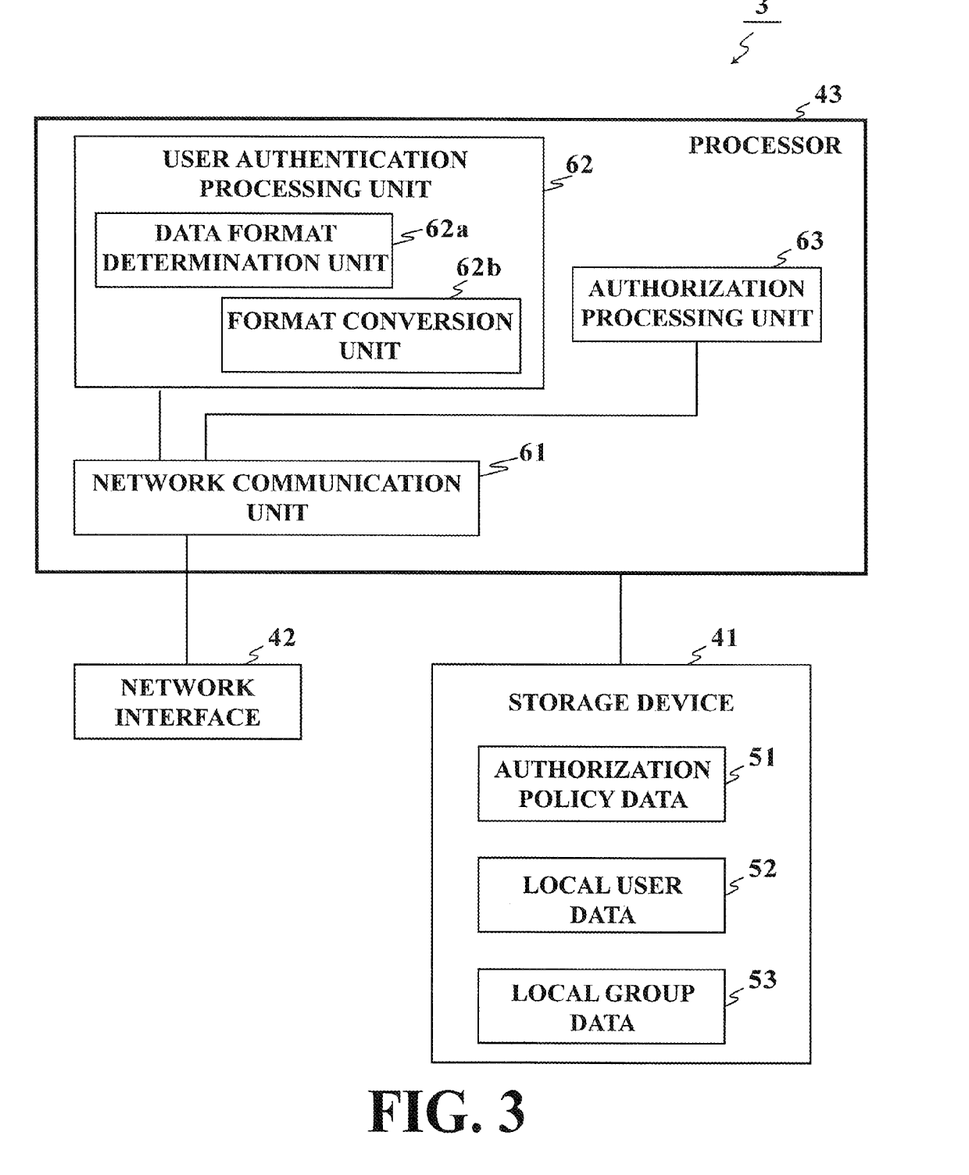
FIG. 3 is a block diagram illustrating a configuration of a user-manager server device according to the first embodiment.

FIG. 3 is a block diagram illustrating a configuration of the user-manager server device 3 according to the first embodiment. The user-manager server device 3 includes a storage device 41, a network interface 42, and a processor 43.

The storage device 41 is a device that stores a program and data. A nonvolatile semiconductor memory, a hard disk drive, or the like may be used as the storage device 41. The storage device 41 stores authorization policy data 51, local user data 52, and local group data 53.

The authorization policy data 51 is data that includes the authorization information used for specifying the functions permitted for use by the logged-in users to the MFPs 1A and/or 1B. The authorization policy data 51 may include authorization information on users and/or groups. The authorization information on users may be applied to a user, and the authorization information on groups may be applied to a user belonging to a group. Further, as the authorization information on users, the authorization policy data 51 may include the authorization information on domain users registered on the directory server device 4 and the authorization information on local users registered on the user-manager server device 3. Further, as the authorization information on groups, the authorization policy data 51 may include the authorization information on domain groups registered on the directory server device 4 and the authorization information on local groups registered on the user-manager server device 3. The authorization information on users includes an ID of a user and information on a function (for example, a function ID) for which the user is permitted or prohibited for use. The authorization information on groups includes an ID of a group and information on a function (for example, a function ID) for which the users belonging to the group are permitted or prohibited for use. For example, the function permitted or prohibited for use may include upper-level items such as printing, scanning, copying, facsimile transmission, and/or lower-level items (for example, a color/black choosing function) accompanying each of the upper-level items.

The local user data 52 is data that includes registration information on local users (for example, user ID and password). The local user is registered on the user-manager server device 3 separately from the domain user registered on the directory server device 4.

The local group data 53 is data that includes registration information on local groups (for example, the group ID and the user IDs of the users belonging to the group). The local group is the group registered on the user-manager server device 3 separately from the domain group registered on the directory server device 4. The local group may include local users and domain users. In other words, the local group may be formed of only the local users, only the domain users, or a combination of the local users and the domain users.

The network interface 42 is a device that maybe connected to the computer network 2 in a wired and/or wireless manner, and enables data communications with other devices that are connected to the network 2.

The processor 43 is configured as a computer that includes a CPU, a ROM, and a RAM, and implements various kinds of processing units by loading a program stored in the ROM or the storage device 41 into the RAM and causing the CPU to execute the program. The processor 43 implements a network communication unit 61, a user authentication processing unit 62, and an authorization processing unit 63.

The network communication unit 61 is a processing unit that controls the network interface 42 to enable data communications with devices on the network 2 using various kinds of communication protocols. For example, the network communication unit 61 may receive the read data obtained by the reader 27 from the MFP 1A, and transmit the authorization information corresponding to the logged-in user to the MFP 1A. Further, for example, the network communication unit 61 may also transmit the user authentication request to the directory server device 4, and receive an authentication result and user information from the directory server device 4.

In the first embodiment, the user authentication processing unit 62 is a processing unit that uses the network interface 42 and the network communication unit 61 to receive the read data output from the reader 27 for reading user identification information from the MFPs 1A and/or 1B with the data type information on the read data, causes a data format determination unit 62a to specify the data format of the received read data from the data type information, causes a format conversion unit 62b to convert the data format into a predetermined data format (for example, from the hexadecimal data format to the character string data format) to specify the user ID corresponding to the read data, and performs a user authentication using the user ID. The user authentication processing unit 62 performs authentication of the logged-in users to the MFPs 1A and 1B by using the local user data 52 and/or the local group data 53. It should be noted that the user authentication processing unit 62 may cause an authentication server device 4 in FIG. 4 to perform the authentication of the logged-in users to the MFPs 1A and/or 1B by using the user data 91a and/or the group data 91b in a directory database 91 via the network interface 42.

In the first embodiment, when the read data output from the reader 27 is encrypted, the user authentication processing unit 62 specifies an encryption system using the data type information, and decrypts the read data by a decryption system corresponding to the encryption system.

The authorization processing unit 63 is a processing unit that extracts the authorization information corresponding to the user logged-in to the MFPs 1A and/or MFP 1B who has succeeded in the user authentication from the authorization policy data 51. After extracting, the authorization processing unit 63 transmits the authentication information to the MFP 1A and/or MFP 1B.

Figure 4:
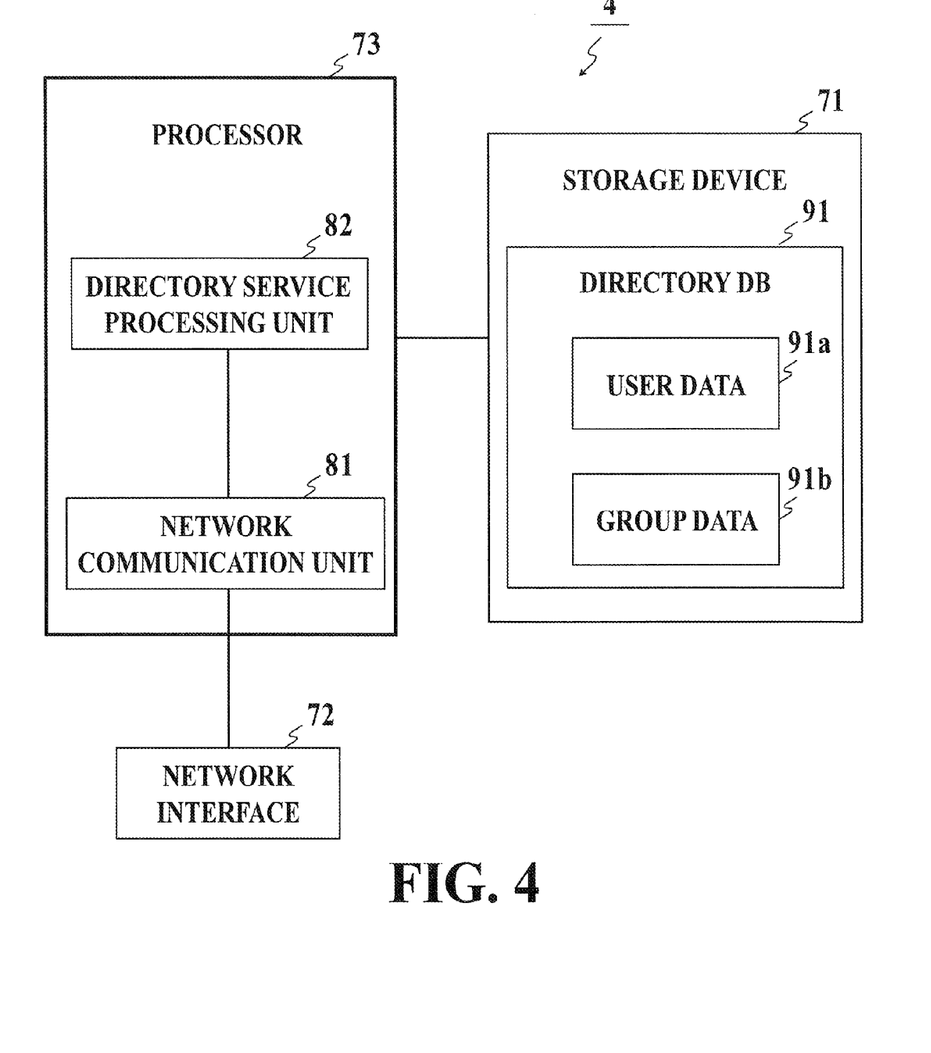
FIG. 4 is a block diagram illustrating a configuration of a directory server device according to the first embodiment or the second embodiment.

FIG. 4 is a block diagram illustrating a configuration of the directory server device 4 according to the first embodiment. The directory server device 4 includes a storage device 71, a network interface 72, and a processor 73. It should be noted that, the directory server device 4 according to the second embodiment described later has the same configuration as that of the first embodiment.

The storage device 71 is a device that stores a program and data. A nonvolatile semiconductor memory, a hard disk drive, or the like is used as the storage device 71. The directory database 91 (DB) for a directory service is built on the storage device 71. The directory database 91 includes the user data 91a and the group data 91b. The user data 91a may include registration information data having authentication information (for example, user ID and password), and user information (for example, contact information such as a telephone number, a facsimile transmission number, an electronic mail address and other attribute information). The group data 91b may include registration information having authentication information (for example, the group ID and user ID list of users belonging to the group), and group information (for example, contact information, a manager information and other attribute information).

The network interface 72 is a device that may be connected to the computer network 2 in a wired and/or wireless manner, and enables data communications with other devices (such as user-manager server device 3) connected to the network 2.

The processor 73 is configured as a computer including a CPU, a ROM, and a RAM, and implements various processing units by loading a program stored in the ROM or the storage device 71 into the RAM and causing the CPU to execute the program. For example, the processor 73 may implement a network communication unit 81 and a directory service processing unit 82.

The network communication unit 81 is a processing unit that controls the network interface 72 to enable data communications with devices on the network 2 using various kinds of communication protocols. For example, the network communication unit 81 may receive the user authentication request, and transmit the authentication result and the user information.

The directory service processing unit 82 is a processing unit that manages the domain user and the domain group. The directory service processing unit 82 performs registration and deletion of the domain user and the domain group, user authentication, and provision of the user information on the domain user and the group information on the domain group. Lightweight directory access protocol (LDAP) authentication, Kerberos authentication, or the like may be used as the user authentication. When a directory service is Active Directory, the directory service processing unit 82 may operate as a domain controller.

Figure 5:
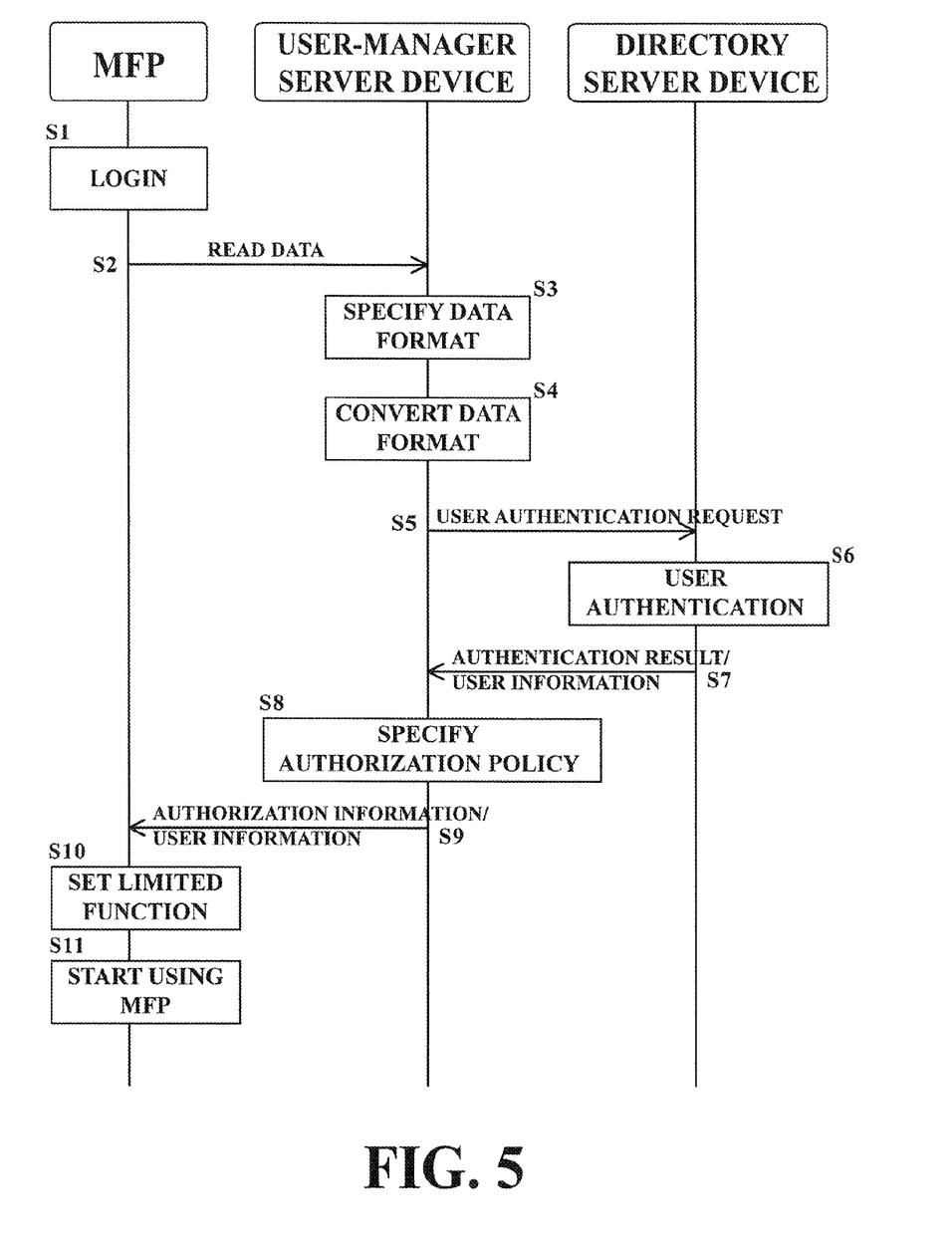
FIG. 5 is a sequence diagram illustrating an operation of respective apparatuses and devices performed when a user logs in to the MFP in the image forming system according to the first embodiment.

FIG. 5 is a sequence diagram illustrating an operation of respective apparatuses and devices performed when the user logs in to the MFP 1A in the image forming system according to the first embodiment. The respective apparatuses and devices operate in the same manner when the user logs in to the MFP 1B.

The reader 27 of the MFP 1A detects the ID card, reads the user identification information from the ID card, and outputs the read data in a predetermined data format (Step S1). When receiving the read data, the control unit 33 uses the network communication unit 32 and the network interface 23 to transmit the read data to the user-manager server device 3 with the data type information (Step S2).

On the user-manager server device 3, the user authentication processing unit 62 uses the network communication unit 61 and the network interface 42 to receive the read data and the data type information and specifies the data format of the received read data from the data type information (Step S3). If the data format is not the predetermined data format, the user authentication processing unit 62 converts the data format into the predetermined data format (Step S4). Then, the user authentication processing unit 62 specifies the user ID corresponding to the read data, and performs the user authentication using the user ID. For example, the user authentication processing unit 62 transmits the user ID and a user authentication request to the directory server device 4 by a predetermined protocol (such as LDAP) (Step S5).

It should be noted that, when the user authentication processing unit 62 specifies the user ID corresponding to the read data and performs the user authentication using the user ID, the user authentication processing unit 62 may use the local user data 52 or the local group data 53 to perform the user authentication in the user manager server device 3.

On the directory server device 4, the directory service processing unit 82 uses the network communication unit 81 and the network interface 72 to receive the user ID and the authentication request by the predetermined protocol, and references the directory database 91 to determine whether or not the user ID belongs to a valid user (Step S6).

Further, the directory service processing unit 82 uses the network communication unit 81 and the network interface 72 to transmit a determination result (that is, authentication result) and, if the authentication has been successful, the user information on the user, to the user-manager server device 3 as a response to the authentication request (Step S7).

On the user-manager server device 3, the user authentication processing unit 62 uses the network communication unit 61 and the network interface 42 to receive the authentication result as the response to the authentication request. If the authentication has been successful, the user authentication processing unit 62 receives the user information with the authentication result and the authorization processing unit 63 references the authorization policy data 51 to specify the authorization information on the user (that is, authorization policy to be applied to the user) (Step S8). The authorization processing unit 63 uses the network communication unit 61 and the network interface 42 to transmit a response indicating the successful authentication to the MFP 1A with the authorization information and the user information (Step S9).

On the MFP 1A, the control unit 33 uses the network communication unit 32 and the network interface 23 to receive the authorization information and the user information, and provides the authorization information to the determination unit 34. Based on the authorization information, the determination unit 34 sets, in the RAM, data that indicates whether or not the user is permitted to use predetermined respective functions that the MFP 1A provides (Step S10).

Then, the user is permitted to use the MFP 1A with the function limited corresponding to the authorization information (Step S11). The control unit 33 references the above-described data set by the determination unit 34 to receive only a job that uses the function permitted to the user and execute the job.

If the user authentication has failed, only a response indicating an authentication failure is transmitted from the user-manager server device 3 to the MFP 1A. When receiving the response indicating the authentication failure, the MFP 1A displays a message indicating the authentication failure onto the operation panel 21, and prohibits the user from using the MFP 1A.

According to the first embodiment, format conversion of the read data obtained by the reader 27 is performed on the user-manager server device 3 that provides the authorization information. Hence, it is unnecessary to process the read data in the MFP 1A (or MFP 1B), and on the MFP 1A (or MFP 1B). In addition, readers having various output data formats can be used and centrally supported. Further, expandability and development efficiency on the server side can be increased.

In the first embodiment, in place of the data type information, the MFPs 1A and 1B may transmit model information indicating the model of the reader 27 to the user-manager server device 3, and the user-manager server device 3 may specify the data format of the read data from the model information. Further, in the first embodiment, the user-manager server device 3 may specify the data format from the contents of the read data.

Second Embodiment

Figure 6:
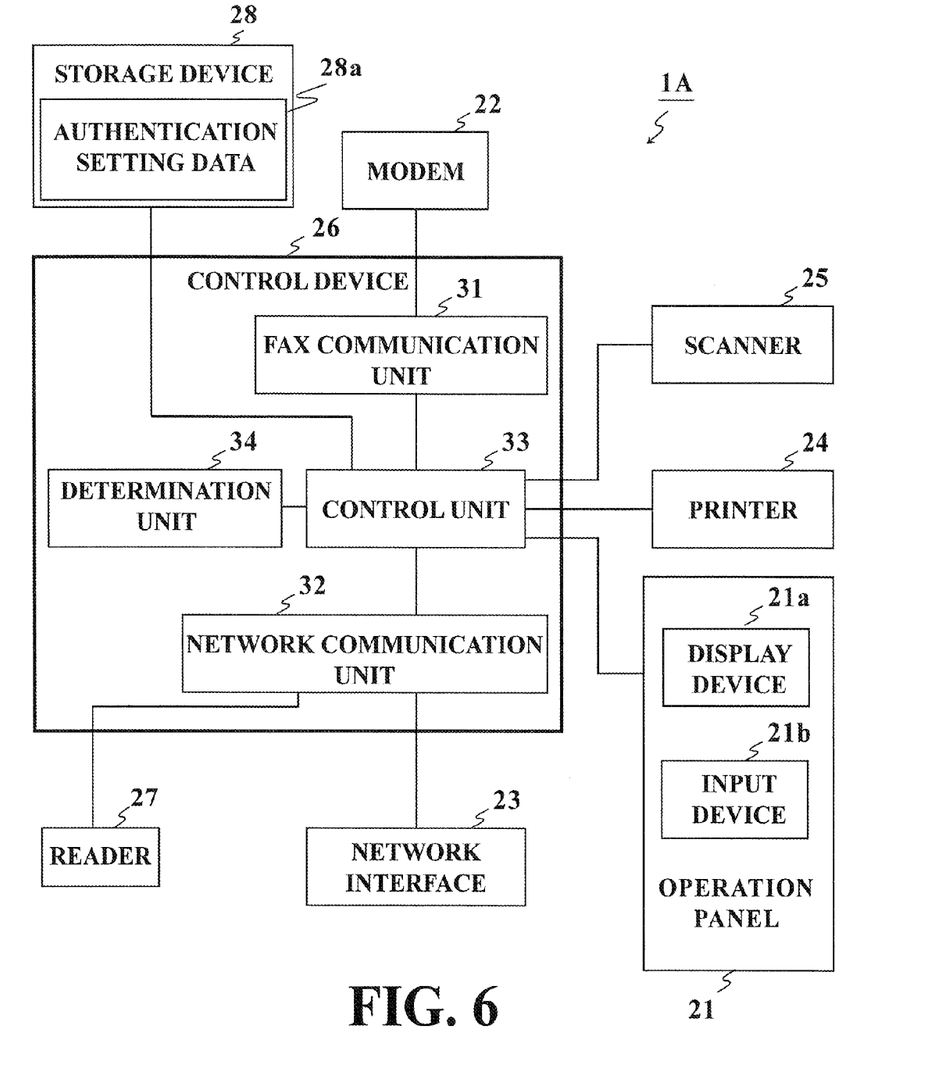
FIG. 6 is a block diagram illustrating a configuration of an MFP according to the second embodiment.

FIG. 6 is a block diagram illustrating a configuration of the MFP 1A according to the second embodiment. The MFP 1B includes the same and similar block components. The MFP 1A according to the second embodiment includes the operation panel 21, the modem 22, the network interface 23, the printer 24, the scanner 25, and the control device 26, having a same and similar configuration as those of the MFP 1A according to the first embodiment. Configuration portions different from those of the first embodiment are described below.

The MFP 1A according to the second embodiment further includes a storage device 28 that stores authentication setting data 28a. The storage device 28 may be a nonvolatile storage device such as a nonvolatile memory or a hard disk drive. The authentication setting data 28a is data that specifies the authentication method permitted on the MFP 1A. For example, the authentication setting data 28a specifies one or more methods from among a plurality of authentication methods including a first authentication method based on the text inputs of the user ID and the password, a second authentication method based on the ID card, and a third authentication method based on the ID card and the text input of the password.

The network communication unit 32 transmits the input data obtained via a login operation performed by the user upon user login to the user-manager server device 3, and receives the authorization information corresponding to the logged-in user from the user-manager server device 3. The input data obtained via the login operation performed by the user corresponds to the authentication method that can be used on the MFP 1A. For example, the input data may include (a) the user ID and the password input as text via the operation panel 21, (b) the read data read from the ID card of the user and output from the reader 27, and (c) the read data and the password input as text via the operation panel 21.

The control unit 33 is a processing unit that receives a job request and controls each of the units within the MFP 1A to execute a job corresponding to the job request. The job requests may include the print request, the scan request, and the facsimile transmission request. Further, when a login operation occurs, the control unit 33 acquires the input data via at least one of the operation panel 21 and the reader 27, and uses the network communication unit 32 to transmit the input data and request user authentication, authorization information, and the like from the user-manager server device 3. Further, in the second embodiment, by using the network communication unit 32, the control unit 33 transmits an authentication setting request to the user-manager server device 3 at an initialization processing, receives master authentication setting data from the user-manager server device 3, and permits only the authentication method specified by the master authentication setting data as a user authentication method to be performed upon login. The initialization processing may include start-up, recovery from sleep mode, reset of an operation screen, or the like.

Figure 7:
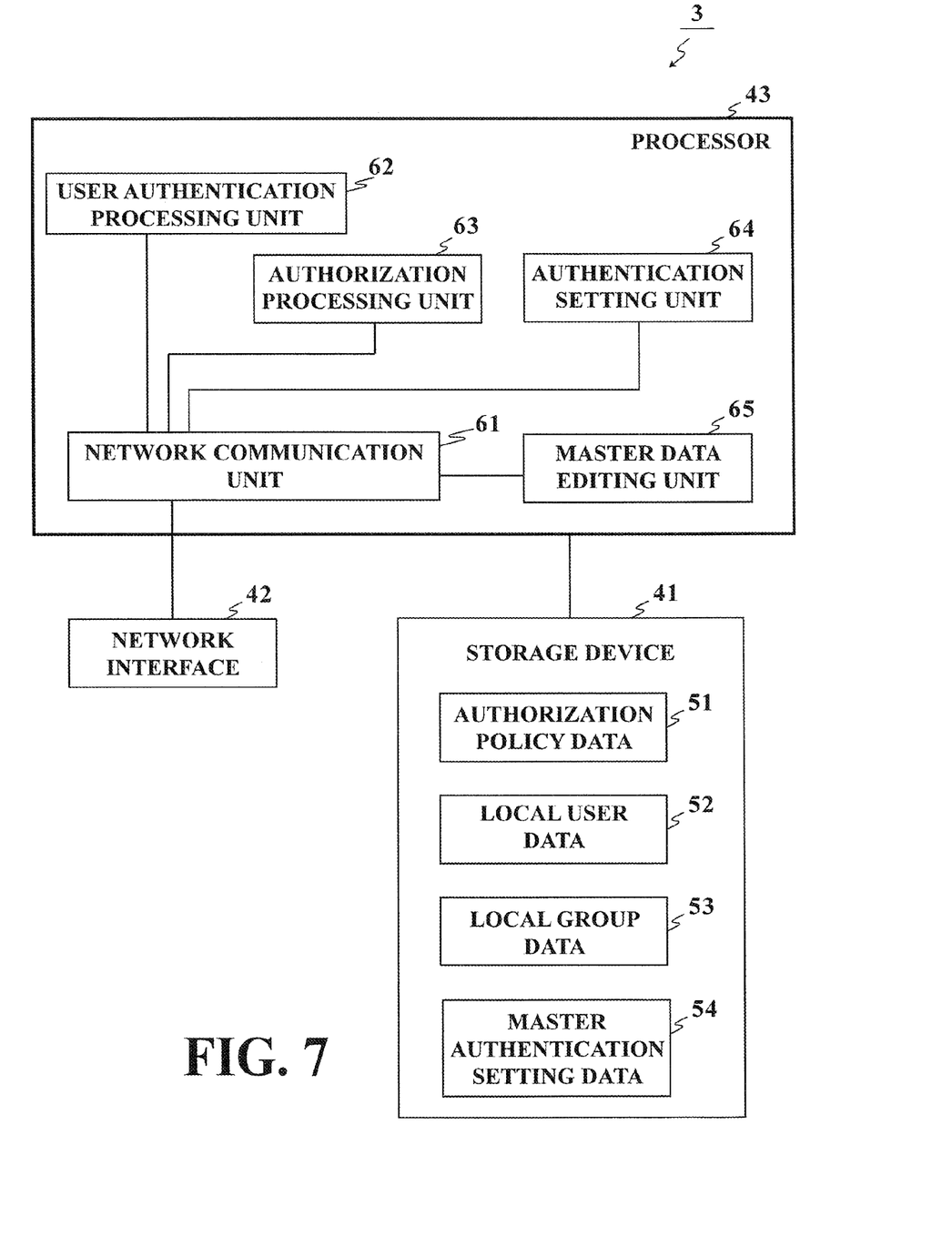
FIG. 7 is a block diagram illustrating a configuration of a user-manager server device according to the second embodiment.

FIG. 7 is a block diagram illustrating a configuration of the user-manager server device 3 according to the second embodiment. The user-manager server device 3 according to the second embodiment includes the storage device 41, the network interface 42, and the processor 43, and has a same and similar configuration as the user-manager server device 3 according to the first embodiment. Portions different from those of the first embodiment are described below.

The storage device 41 stores the authorization policy data 51, the local user data 52, the local group data 53, and master authentication setting data 54. The master authentication setting data 54 is data that specifies the authentication method that can be used on a plurality of predetermined image forming apparatuses (for example, MFPs 1A and 1B). That is, one master authentication setting data 54 is globally utilized on the MFPs 1A and 1B. The network communication unit 61 receives an edit request for the master authentication setting data 54 from the terminal device 5.

In the second embodiment, the user authentication processing unit 62 is a processing unit that uses the network interface 42 and the network communication unit 61 to receive from the MFP 1A and/or MFP 1B the input data (that is, identification information on the ID card and/or the user) obtained by the MFP 1A, identifies the user ID (or a pair of the user ID and the password) corresponding to the input data, and performs the user authentication using the user ID (or a pair of the user ID and the password). The user authentication processing unit 62 performs the authentication of the logged-in users to the MFPs 1A and/or 1B by using the local user data 52 and/or the local group data 53. It should be noted that the user authentication processing unit 62 may cause an authentication server device 4 in FIG. 4 to perform the authentication of the logged-in users to the MFPs 1A and/or 1B by using the user data 91a and/or the group data 91b in the directory database 91 via the network interface 42.

The user-manager server device 3 according to the second embodiment further includes an authentication setting unit 64 and a master data editing unit 65.

The authentication setting unit 64 is a processing unit that uses the network interface 42 and the network communication unit 61 to transmit the master authentication setting data 54 to the MFPs 1A and/or 1B and cause the storage device 28 to store the master authentication setting data 54 as the authentication setting data 28a. When receiving the authentication setting request from the MFPs 1A and/or 1B via the network interface 42 and the network communication unit 61, the authentication setting unit 64 transmits the master authentication setting data 54 to the MFPs 1A and/or 1B. The authentication setting request may be transmitted at the start-up or the recovery from sleep mode of the MFP 1A and/or 1B, and may be received by the authentication setting unit 64. Alternatively, the authentication setting request maybe transmitted when the operation panel of the MFP 1A or 1B is reset to have a login screen displayed, and may be received by the authentication setting unit 64. Further, when receiving the authentication setting request from the MFPs 1A and/or 1B, the authentication setting unit 64 identifies the authentication method that can be used on the MFPs 1A and/or 1B at that time. If the identified authentication method differs from the authentication method specified by the master authentication setting data, the authentication setting unit 64 transmits the master authentication setting data 54 to the MFPs 1A and/or 1B and updates the authentication setting data 28a on the MFPs 1A and/or 1B.

A value of the master authentication setting data transmitted to the MFPs 1A and/or 1B is stored in an update log in the storage device 41. Then, the authentication method that can be used on the MFPs 1A and/or 1B, when the authentication setting request is received, is identified from the value of the master authentication setting data previously transmitted to the MFPs 1A and/or 1B. If the value of the master authentication setting data previously transmitted is not saved, the master authentication setting data 54 is transmitted. By recording in the update log a timing when the master authentication setting data 54 is transmitted to each of the MFPs 1A and 1B and a timing when the master authentication setting data 54 is updated on the user-manager server device 3, the master authentication setting data 54 may be transmitted if an update occurs after the master authentication setting data 54 is transmitted.

The master data editing unit 65 is a processing unit that uses the network interface 42 and the network communication unit 61 to receive an edit instruction from the terminal device 5 and edits the master authentication setting data 54 responsive to receiving the edit instruction.

FIG. 4 is a block diagram illustrating a configuration of the directory server device 4 according to the second embodiment. The directory server device 4 according to the second embodiment has a same and similar configuration as that of the first embodiment.

Figure 8:
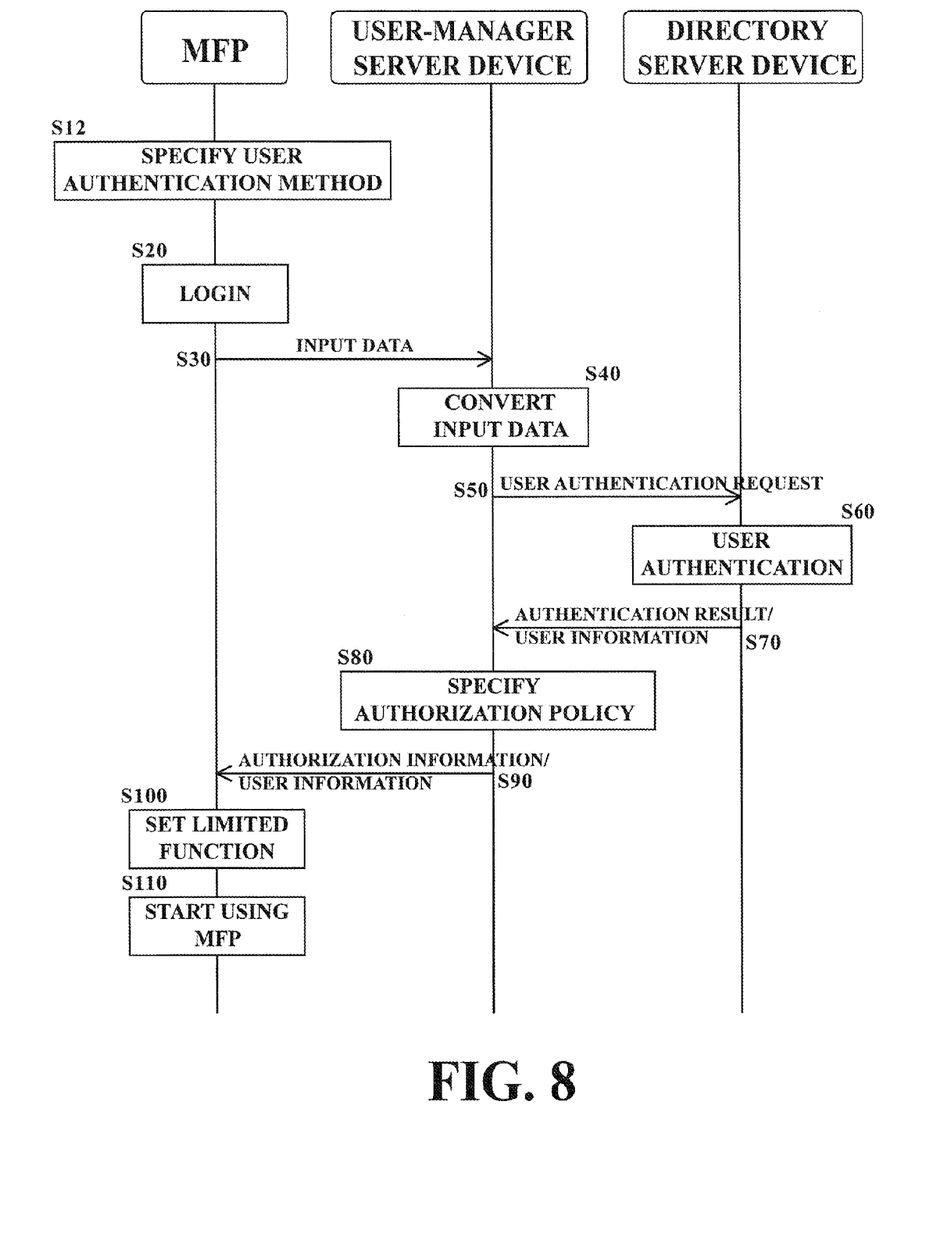
FIG. 8 is a sequence diagram illustrating an operation of respective apparatuses and devices performed when the user logs in to the MFP in the image forming system according to the second embodiment.

FIG. 8 is a sequence diagram illustrating an operation of respective apparatuses and devices performed when the user logs in to the MFP 1A in the image forming system according to the second embodiment. The respective apparatuses and the devices operate in a same and similar manner when the user logs in to the MFP 1B.

On the MFP 1A, when the login screen is displayed after the initialization processing such as after the start-up, after the recovery from sleep mode, or after the logout, the control unit 33 references the authentication setting data 28a to specify the authentication method that is permitted at the present time (Step S12). Further, the control unit 33 transmits the authentication setting request to the user-manager server device 3, and if there is a change in the master authentication setting data 54, recieves the master authentication setting data 54 to update the authentication setting data 28a (Steps S31, S32, and S35 described later). Then, the control unit 33 displays the login screen corresponding to the specified authentication method on the operation panel 21.

After that, when there occurs a login operation performed by the user, the control unit 33 receives the input data from at least one of the reader 27 and the operation panel 21 (Step S20), and uses the network communication unit 32 and the network interface 23 to transmit the input data to the user-manager server device 3 (Step S30).

On the user-manager server device 3, the user authentication processing unit 62 uses the network communication unit 61 and the network interface 42 to receive the input data. When receiving the input data, the user authentication processing unit 62 determines which of the following the input data is: (a) the user ID and the password; (b) the read data (card ID) of the ID card; or (c) the read data (card ID) of the ID card and the password.

If the input data is (b) the read data (card ID) of the ID card, when the authentication based on the ID card is permitted by the master authentication setting data 54, the user authentication processing unit 62 references a conversion table (not illustrated) stored in the storage device 41 to convert the card ID into the user ID and the password (Step S40). Further, if the input data is (c) the read data (card ID) of the ID card and the password, when the authentication based on the ID card and the password is permitted by the master authentication setting data 54, the user authentication processing unit 62 references the conversion table (not illustrated) stored in the storage device 41 to convert the card ID into the user ID (Step S40).

Then, the user authentication processing unit 62 transmits the user ID and the password that have been obtained from the input data and the user authentication request to the directory server device 4 using the predetermined protocol (such as LDAP) (Step S50).

On the directory server device 4, the directory service processing unit 82 uses the network communication unit 81 and the network interface 72 to receive the user ID, the password, and the authentication request using the predetermined protocol, and references the directory database 91 to determine whether or not the user ID and the password belong to a valid user (Step S60).

Further, the directory service processing unit 82 uses the network communication unit 81 and the network interface 72 to transmit a determination result (that is, authentication result) and, if the authentication has been successful, the user information on the user, to the user-manager server device 3 as a response to the authentication request (Step S70).

On the user-manager server device 3, the user authentication processing unit 62 uses the network communication unit 61 and the network interface 42 to receive the authentication result as the response to the authentication request. If the authentication has been successful, the user authentication processing unit 62 receives the user information with the authentication result and the authorization processing unit 63 references the authorization policy data 51 to specify the authorization information on the user (that is, authorization policy to be applied to the user) (Step S80). The authorization processing unit 63 uses the network communication unit 61 and the network interface 42 to transmit a response indicating the successful authentication to the MFP 1A with the authorization information and the user information (Step S90).

On the MFP 1A, the control unit 33 uses the network communication unit 32 and the network interface 23 to receive the authorization information and the user information, and provides the authorization information to the determination unit 34 (Step S100). Based on the authorization information, the determination unit 34 sets, in the RAM, data indicating whether or not the user is permitted to use predetermined respective functions that the MFP 1A provides.

Then, the user is permitted to use the MFP 1A with the function limited corresponding to the authorization information (Step S110). On the MFP 1A, the control unit 33 references the above-mentioned data set by the determination unit 34 to receive only a job that uses the function permitted to the user and execute the job.

If the user authentication has failed, a response indicating an authentication failure is transmitted from the user-manager server device 3 to the MFP 1A. When receiving the response indicating the authentication failure, the MFP 1A displays a message indicating the authentication failure on the operation panel 21, and prohibits the user from using the MFP 1A.

Figure 9:
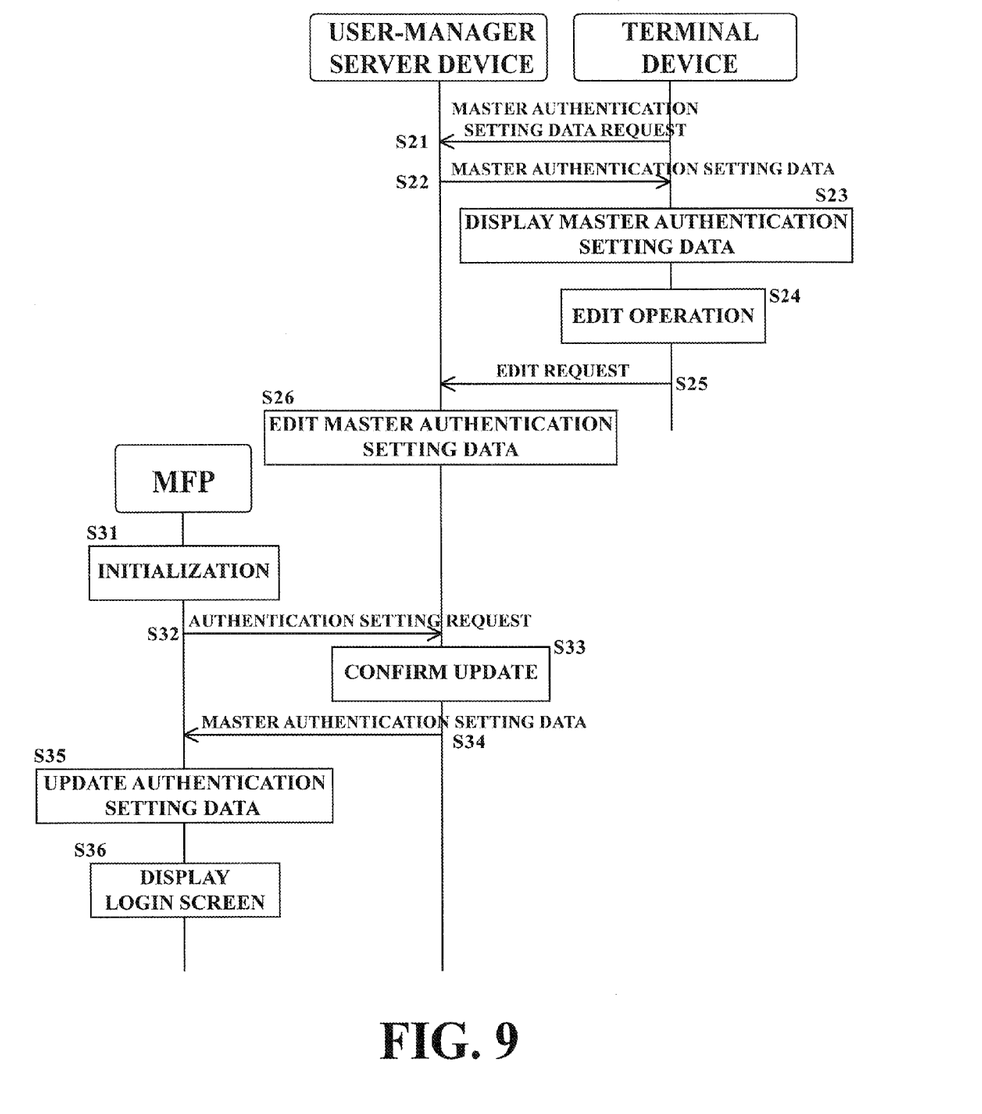
FIG. 9 is a sequence diagram illustrating an operation of respective apparatuses and devices performed when master authentication setting data is edited and transferred to the MFP in the image forming system according to the second embodiment.

Next described is an operation of respective apparatuses and devices performed when the master authentication setting data is edited and is transferred to the MFP in the above-described image forming system. FIG. 9 is a sequence diagram illustrating the operation of the respective apparatuses and devices performed when the master authentication setting data 54 is edited and is transferred to the MFPs 1A and 1B in the image forming system illustrated in FIG. 1.

The terminal device 5 illustrated in FIG. 1 transmits a request for the master authentication setting data to the user-manager server device 3 via the network 2 by the operation of the administrator user (Step S21). For example, the terminal device 5 uses a web browser to transmit the request to a predetermined uniform resource locator (URL) of the user-manager server device 3. When receiving the request, the network communication unit 61 reads the master authentication setting data 54, and transmits the master authentication setting data 54 to the terminal device 5 as a response to the request (Step S22). When receiving the master authentication setting data 54, the terminal device 5 displays an edit screen for the master authentication setting data 54 on a display device (not illustrated) (Step S23).

Figure 10:
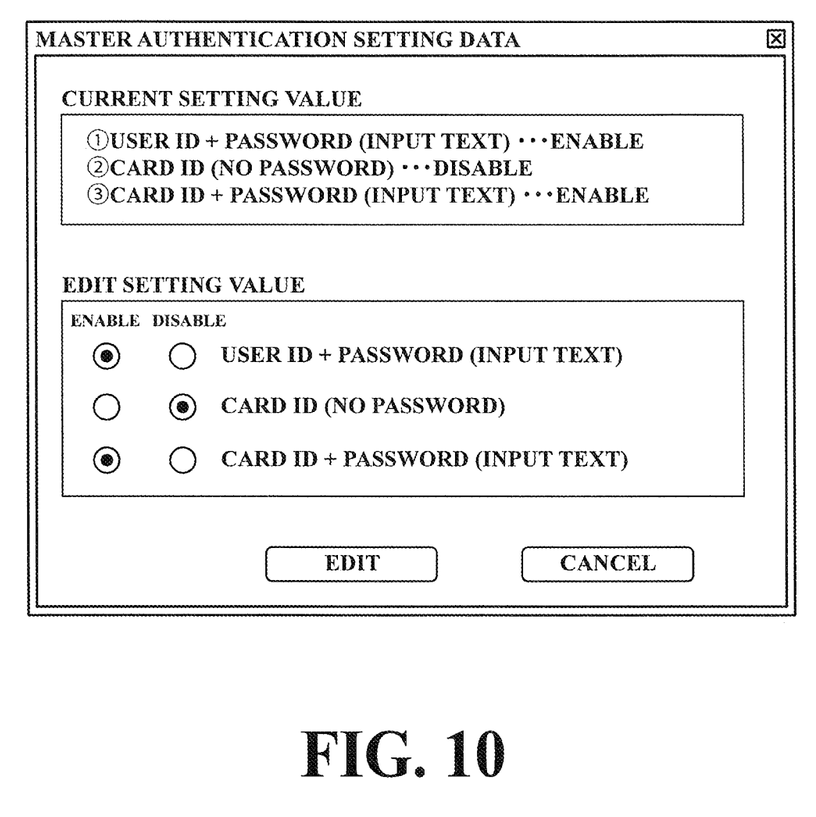
FIG. 10 is a diagram illustrating an example of an edit screen for the master authentication setting data displayed on a terminal device in the image forming system according to the second embodiment.

FIG. 10 is a diagram illustrating an example of the edit screen for the master authentication setting data displayed on the terminal device 5 illustrated in FIG. 1. As illustrated in FIG. 10, current setting values of the master authentication setting data are displayed on the edit screen. Further, an operation section displayed on the edit screen causes an edit operation to be performed on the setting values to specify whether or not the respective authentication methods can be used. When there is a user operation (that is, edit operation) performed via the operation section, the user operation is detected by an input device (not illustrated) (Step S24). Pairs of radio buttons for selecting "enable/disable" in the edit operation are displayed as the operation section. Only one of a pair of radio buttons regarding each of the authentication methods is selected, and the edit operation is confirmed by depression of an edit button.

When there is an edit operation as described above, the terminal device 5 transmits the edited master authentication setting data to the user-manager server device 3 via the network 2 with the edit request (Step S25). When receiving the edit request and the edited master authentication setting data, the user-manager server device 3 uses the received master authentication setting data to update the master authentication setting data 54 stored in the storage device 41 (Step S26).

In the above-described manner, the master authentication setting data 54 is updated by the administrator user.

Then, on the MFP 1A and/or MFP 1B, after the initialization processing (Step S31) such as after the start-up, after the recovery from sleep mode, or after the logout, the control unit 33 transmits the authentication setting request to the user-manager server device 3 (Step S32).

On the user-manager server device 3, when receiving the authentication setting request, the authentication setting unit 64 references the updated log of the master authentication setting data to determine whether or not the master authentication setting data transmitted to the MFP 1A and/or MFP 1B differs from the master authentication setting data 54 at the present time (that is, whether or not there is an update in the master authentication setting data 54) (Step S33).

If there is an update in the master authentication setting data 54, the authentication setting unit 64 transmits the master authentication setting data 54 at the present time to the MFP 1A and/or MFP 1B (Step S34). If there is no update in the master authentication setting data 54, the authentication setting unit 64 transmits a response indicating "no update" to the MFP 1A and/or MFP 1B.

When receiving the master authentication setting data 54, the control unit 33 of the MFP 1A and/or MFP 1B uses the master authentication setting data 54 to update the authentication setting data 28a in the storage device 28 (Step S35). Then, the control unit 33 references the updated authentication setting data 28a to specify the permitted authentication method, and displays the login screen corresponding to the method on the operation panel 21 (Step S36).

If the response indicating "no update" is received, the control unit 33 references the authentication setting data 28a, without updating the authentication setting data 28a, to specify the permitted authentication method, and displays the login screen corresponding to the method on the operation panel 21.

As described above, the master authentication setting data in the user-manager server device 3 is automatically transferred to the MFP 1A and/or MFP 1B, and hence the authentication methods on a large number of image forming apparatuses can be collectively set with a simple operation. Further, the authentication method that can be used is automatically updated on each of the image forming apparatuses, which prevents updating failures.

The present disclosure includes various other embodiments. For example, other designs can be used in which the above-described components are each performed.

In the first or second embodiment, the local users and the domain users coexist in the local group, but the local group may be formed of only local users or the local group may be formed of only domain users, or some combination thereof.

In the first or second embodiment, the user-manager server device 3 and the directory server device 4 maybe configured to perform data communications via another network different from the network 2 by connecting the user-manager server device 3 to the other network instead of being connected to the network 2.

In the first or second embodiment, the MFPs 1A and 1B are used as the image forming apparatuses, but a printer, a copier, and the like may additionally or alternatively be used. Further, in the first or second embodiment, while the illustrated image forming system includes three image forming apparatuses, the image forming system may alternatively include less than three or more than three image forming apparatuses.

In the first or second embodiment, the access right level to the MFP may be included in the authorization information. For example, the access right level may be set to "administrator" or "general user." If set to "administrator", it is possible to use a function such as maintenance, which cannot be used by the general user.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system comprising:
    an image forming apparatus, having a reader that reads user identification information including a card ID of an ID card corresponding to a logged-in user, wherein the image forming apparatus is configured to connected to a network and transmit the user identification information with data type information;
    a user-manager server device configured to i) connect to the network, ii) receive the user identification information with the data type information from the image forming apparatus, iii) specify a data format of the user identification information using the data type information, iv) convert the data format into a predetermined data format, v) specify a user ID corresponding to the card ID included in the user identification information, vi) transmit the user ID, and vii) if a user authentication is successful, transmit authorization information corresponding to the logged-in user included in authorization policy data to the image forming apparatus; and
    an authentication server device configured to connect to the network, receive the user ID from the user-manager server device, perform the user authentication, and transmit an authentication result to the user-manager server device,
    where
        the authorization policy data includes authorization information on users and authorization information on groups,
        the authorization information on users includes authorization information on domain users and authorization information on local users,
        the authorization information on groups includes authorization information on domain groups and authorization information on local groups,
        the user-manager server device includes local groups,
        the authentication server device includes domain groups, and
        the local groups are each formed of at least one of only local users, only domain users, and a combination of the local users and the domain users.

2. The image forming system according to claim 1, wherein:
    the user identification information is encrypted; and
    the user-manager server device is configured to decrypt the user identification information using the data type information.

3. An image forming method, comprising:
    via a reader included in an image forming apparatus connected to a network, reading user identification information including a card ID of an ID card corresponding to a user;
    via the image forming apparatus, transmitting the user identification information with data type information to a user-manager server device connected to the network;
    via the user-manager server device,
        receiving the user identification information with the data type information,
        specifying a data format of the user identification information using the data type information,
    converting the data format into a predetermined data format,
        specify a user ID corresponding to the card ID included in the user identification information,
        transmitting the user ID to an authentication server device connected to the network, and
        if a user authentication is successful, transmitting authorization information corresponding to the logged-in user included in authorization policy data to the image forming apparatus; and
    via the authentication server device,
        receiving the user ID from the user-manager server device,
        performing the user authentication, and
        transmitting an authentication result to the user-manager server device,
    wherein;
        the authorization policy data includes authorization information on users and authorization information on groups,
        the authorization information on users includes authorization information on domain users and authorization information on local users,
        the authorization information on groups includes authorization information on domain groups and authorization information on local groups,
        the user-manager server device includes local groups,
        the authentication server device includes domain groups, and
        the local groups are each formed of at least one of only local users, only domain users,
        and a combination of the local users and the domain users.

* * * * *